United States Patent
Alvarez

(10) Patent No.: US 9,981,516 B1
(45) Date of Patent: May 29, 2018

(54) AUTOMATIC EJECTING AND RETRACTING TRAILER HITCH

(71) Applicant: Felipe J. Alvarez, Miami, FL (US)

(72) Inventor: Felipe J. Alvarez, Miami, FL (US)

( * ) Notice: Subject to any disclaimer, the term of this patent is extended or adjusted under 35 U.S.C. 154(b) by 0 days. days.

(21) Appl. No.: 15/083,275

(22) Filed: Mar. 28, 2016

Related U.S. Application Data

(63) Continuation of application No. 62/178,844, filed on Apr. 15, 2015.

(51) Int. Cl.
| | |
|---|---|
| *B60D 1/54* | (2006.01) |
| *B60D 1/24* | (2006.01) |
| *B60D 1/155* | (2006.01) |
| B60D 1/26 | (2006.01) |
| B60D 1/06 | (2006.01) |

(52) U.S. Cl.
CPC ............... *B60D 1/54* (2013.01); *B60D 1/155* (2013.01); *B60D 1/246* (2013.01); *B60D 1/06* (2013.01); *B60D 1/26* (2013.01)

(58) Field of Classification Search
CPC ............... B60D 1/54; B60D 2001/542; B60D 2001/544; B60D 2001/546; B60D 2001/548
See application file for complete search history.

(56) References Cited

U.S. PATENT DOCUMENTS

| | | | | |
|---|---|---|---|---|
| 2,612,384 A * | 9/1952 | Wiegman | ................. | B60D 1/54 280/491.2 |
| 5,011,177 A * | 4/1991 | Grice | .................... | B60P 3/1083 280/482 |
| 6,189,910 B1 * | 2/2001 | Bartel | ...................... | B60D 1/06 280/491.1 |
| 7,497,458 B2 * | 3/2009 | Daniel | ................... | B60D 1/246 280/479.1 |
| 8,091,913 B1 * | 1/2012 | White | ...................... | B60D 1/06 280/456.1 |
| 2007/0138760 A1 * | 6/2007 | Granzow | ............... | B60D 1/155 280/491.2 |
| 2014/0312594 A1 * | 10/2014 | St. Pierre | ............... | B60D 1/075 280/482 |
| 2016/0185170 A1 * | 6/2016 | McAllister | ............ | B60D 1/485 280/479.1 |

* cited by examiner

*Primary Examiner* — Kevin Hurley
(74) *Attorney, Agent, or Firm* — Widerman Malek PL; Daniel C. Pierron

(57) ABSTRACT

One embodiment of a trailer frame (9), which has a receiver section (4) made of a square metal tube on which the hitch (7) travels in and out as a result of the mechanical energy source activated at the push of a button located on the vehicle's dashboard, a button located in the trunk at the rear of the vehicle or by the remote access device. When extending the hitch is desired, the corresponding button is pressed activating the solenoid (5), subsequently activating the motor (1) and as a result the hitch extends for use. Immediately after the solenoid activates again, locking the hitch (7) to the receiver section of the trailer frame, thus transferring the load of the trailer from the motor and lead screw (3) to the trailer frame (9). When retracting is desired, the corresponding button is pressed activating the solenoid (5), subsequently activating the motor (1), as a result the hitch retracts for storage. After the hitch completes its travel, again the solenoid locks the hitch in place. Status indicators in the dash or trunk can inform the user of the position of the hitch (7) at all times. Other variations of this embodiment are possible.

1 Claim, 10 Drawing Sheets

AUTOMATIC EJECTING AND RETRACTING TRAILER HITCH

CROSS REFERENCE TO RELATED APPLICATIONS

This application claims the benefit of Provisional Patent Application Ser. No. 62/178,844, Filed 2015 Apr. 15 by the present inventor.

FEDERALLY SPONSORED RESEARCH

Not Applicable

SEQUENCE LISTING OR PROGRAM

Not Applicable

BACKGROUND

Field of Invention

This invention relates to trailer hitches and hitch receiver, presently manually inserted for use. This device pertains to the field of the automobile industry in general, and all land vehicles.

Prior Art

Presently trailer hitches with all of their components are manufactured for manual use and operation. The user must insert or remove the hitch from the receiver/frame manually. This is an inconvenient and cumbersome activity for the user. In addition to that, most users prefer, in order to avoid removing or reinstalling the hitch, to leave it installed at all times.

This manual operation poses several problems. It is so inconvenient to remove and reinstall the hitch, that users for the most part prefer to leave the hitch in place, (inserted on the receiver at all times). Most users do not bother to remove it when not in use. A trailer hitch is only needed when towing a trailer. Most hitches are not used, all of the time. Having a trailer hitch protruding from the rear of a vehicle creates a number of problems. It causes injuries on adults but specially children when they run around cars, especially at night when the hitch is difficult to see. They cause damage to other vehicles when they get too close. They are hard to see during the day but especially at night. If you have a luxury vehicle, it detracts from the beauty of any vehicle.

The ADVANTAGES and BENEFITS of this particular Patent are:

1.—It will support all sizes and classes of hitches specially Class I, Class II, Class III and beyond.

2.—By virtue of its design it can be easily incorporated into existing aftermarket trailer frames and land vehicles, with minimum or no modifications.

3.—It can be easily adapted and incorporated into any existing automobile or vehicle manufactured today at the factory with a simple bumper modification that provides for a small access door thru the bumper.

4.—Its design makes it virtually universal.

5.—Ejecting and Retracting can be achieved in many ways such as a set of push buttons and indicators in the dashboard, incorporating it into the keyless entry system of a car, or a set of push buttons in the trunk compartment.

6.—It maintains its load capacity, comparable to that of existing aftermarket hitches.

7.—Simplicity. No more kneeling behind your car fumbling to install your hitch, especially at night time, with or without a source of light.

8.—According with GreenCarReports.com the world has an estimated 1 billion vehicles on the road. Many vehicles would benefit from this patent and many accidents can be avoided.

9.—In the past, when new innovations in the auto industry appeared, they were optional, eventually they became standard on every vehicle. The same will happen with this invention.

The present invention relates to the automation of a trailer hitch, and more particularly, the means by which to automate the extending and retracting of a trailer hitch.

This automated operation can be accomplished Electrically (by means of an electric motor), Hydraulically (hydraulic piston), Pneumatically (air piston) and by Vacuum (vacuum piston).

A trailer hitch is used to transfer the weight of a cargo load to the chassis of a vehicle. As a standard, currently, trailer hitches remain a manual labor to detach and reattach onto a vehicle's frame. The hitch must extend far enough away from the rear of the vehicle to allow for clearance of a ball hitch to be connected to a trailer. The trailer hitch is locked with a pin in this position, extended away from the bumper of the vehicle and generally at a low line of sight. This creates a safety hazard to the persons in the near vicinity. The location of most hitches are hidden from view when the driver of the vehicle is reversing into areas, whether or not the trailer hitch is in use. This situation often times causes a collision and damages other vehicles or property.

SUMMARY

This Trailer Hitch is basically made of square steel tubing, a water proof or water resistant electric motor, a square threaded rod, one or two solenoids, two sensors and a control board.

The object of the present invention is to solve the problem with the method for which a trailer hitch may be concealed. Another object of the present invention is to solve the problem in the automation of concealing a trailer hitch. The aforementioned devices do not limit the objects in which this invention seeks to achieve and any objects not mentioned herein will be apparent to those of conventional skill in the art to which this invention pertains to.

The present invention's objects can be achieved by concealing the trailer hitch within or below the rear bumper of a vehicle, near the connection between the hitch frame and the vehicle's chassis. This method introduces the possibility of aftermarket modifications to a vehicle's bumper or hitch frame.

In another aspect of the present design, the automation of this concealment improves the quality of a hitch while reducing the need for manual labor of the user. The use of a motor, lead screw and lead screw nut attached to the hitch will be the means for which the hitch will be actuated to be concealed below or into the vehicle's bumper. Electronic sensors in combination with an electric solenoid will be the means for which the trailer hitch will be locked into either its extended or retracted state. The motor and lead screw do not maintain the load of the trailer, rather, the solenoid pin will transfer the load onto the vehicle's chassis through the hitch frame. It is important to note that the only purpose of the motor and lead screw is to eject and retract the hitch, not to carry the trailer's load. The trailer's load is to be transferred from the hitch, to the hitch receiver to the hitch's frame or to the vehicle's frame by means of the solenoid pin.

DRAWINGS—FIGURES

The accompanying drawings are used to supplement this information by clarifying the invention, illustrating the invention and explaining the principle of the invention together with description.

DRAWINGS—REFERENCE NUMERALS LIST

Figure 1:
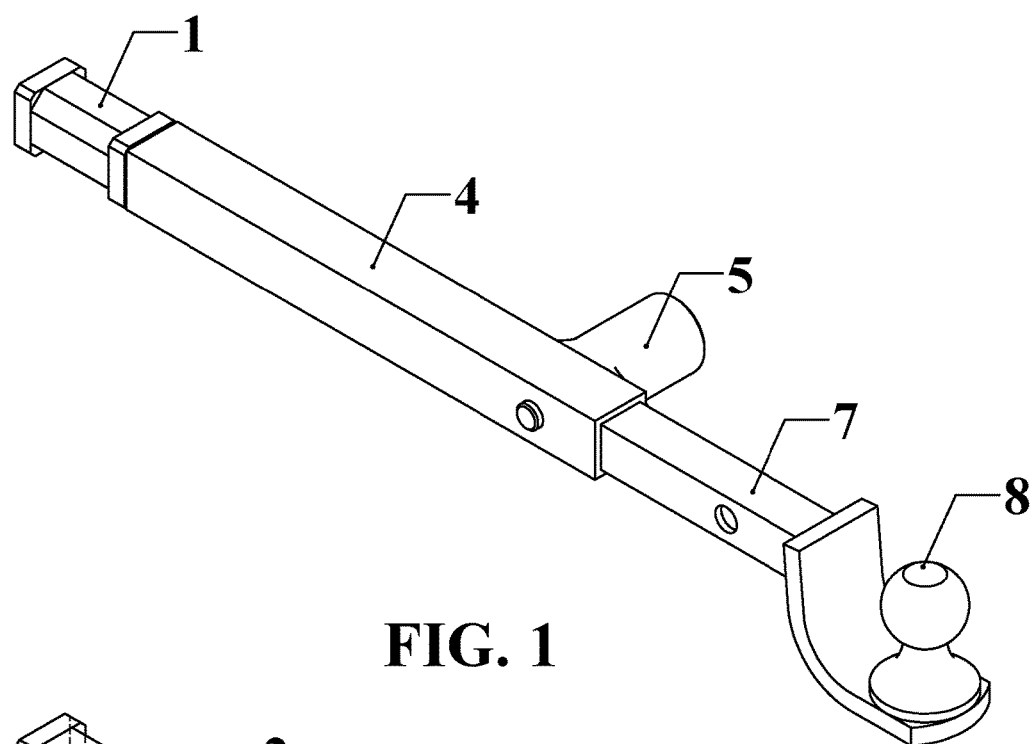
FIG. 1 is an isometric view of the Automatic Ejecting and Retracting Trailer Hitch showing key components of the invention.

ITEM 1 is a 12 Volt water resistant or waterproof electric motor (FIG. 1).

Figure 2:
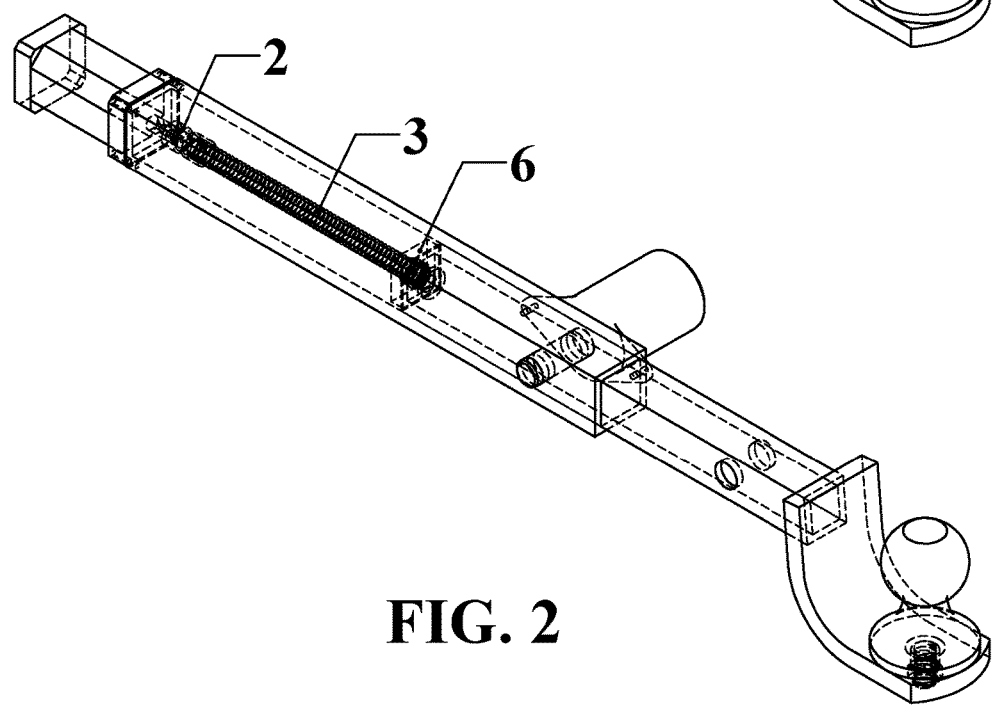
FIG. 2 is an isometric view of the invention showing key internal components of the invention.
Figure 3:
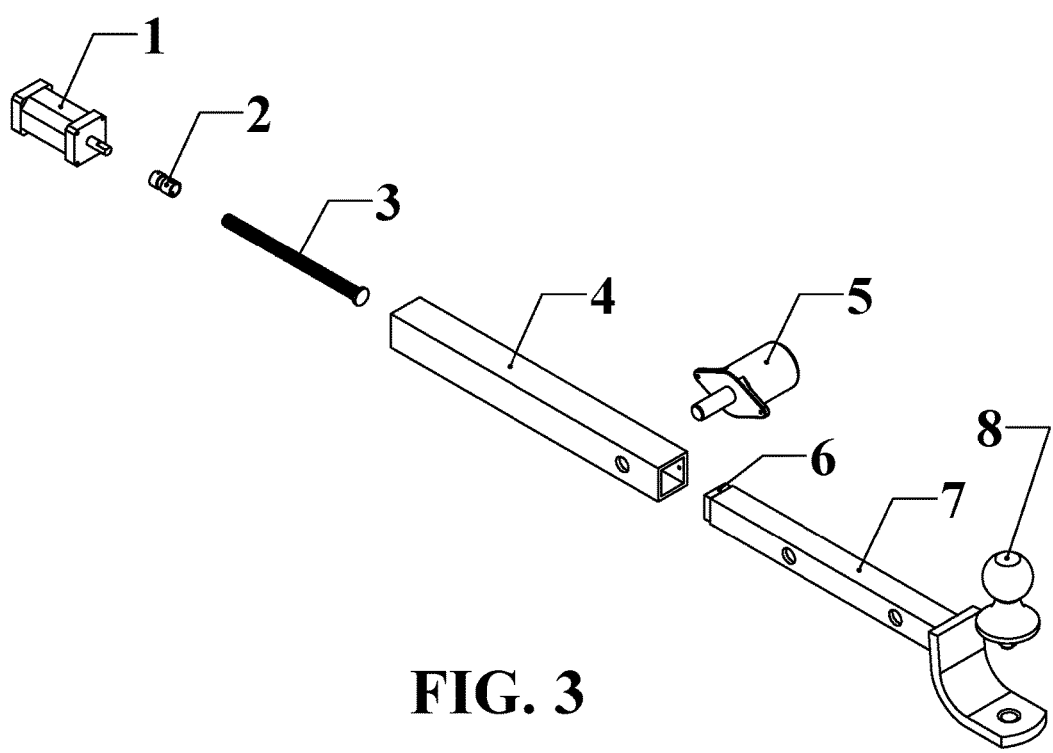
FIG. 3 is an isometric exploded view of the invention showing all of the key components of the invention.
Figure 4:
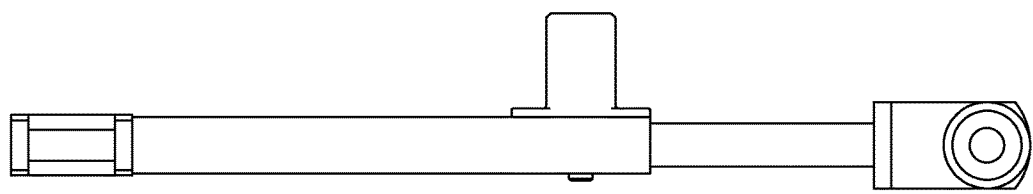
FIG. 4 is the top view of the invention illustrating relative locations of the motor, solenoid and ball hitch.
Figure 5:
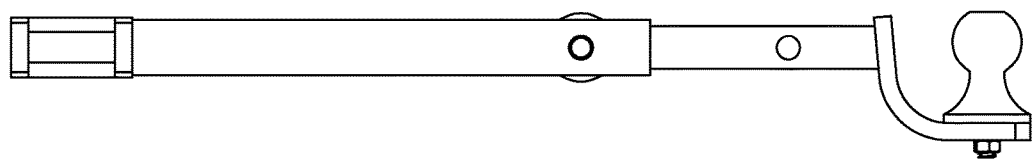
FIG. 5 is the front view of the invention illustrating relative locations of the motor, solenoid and ball hitch.
Figure 6:
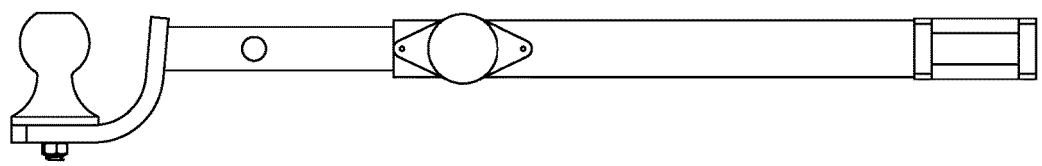
FIG. 6 is the back view of the invention illustrating relative locations of the motor, solenoid and ball hitch.
Figure 7:
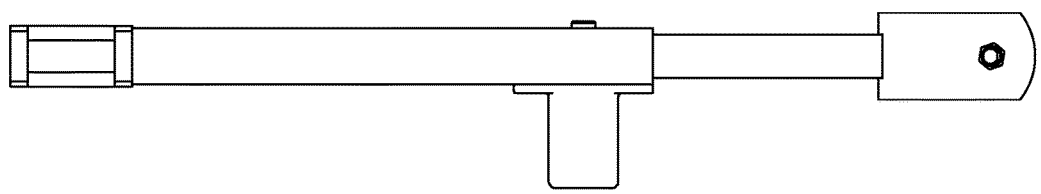
FIG. 7 is the bottom view of the invention illustrating relative locations of the motor, solenoid and hitch.
Figure 8:
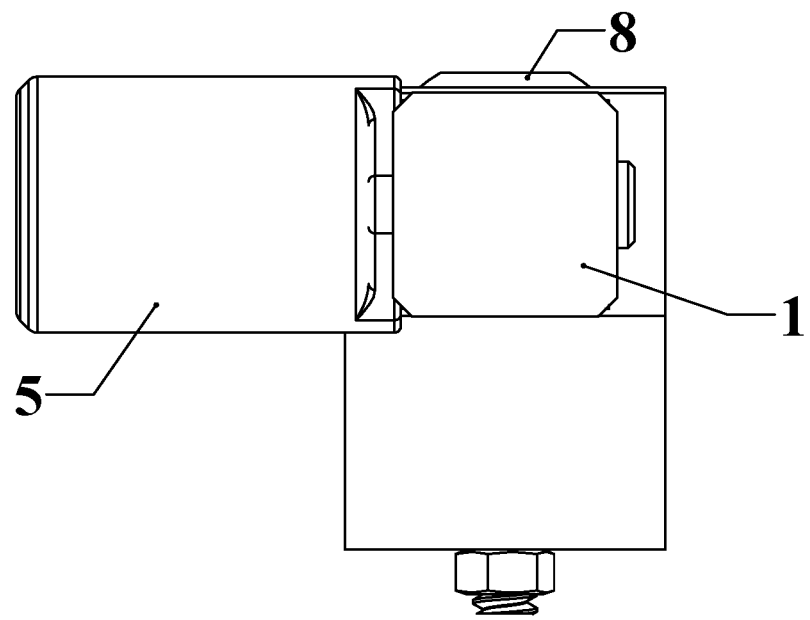
FIG. 8 is the left view of the invention illustrating relative locations of the motor, solenoid and ball hitch.
Figure 9:
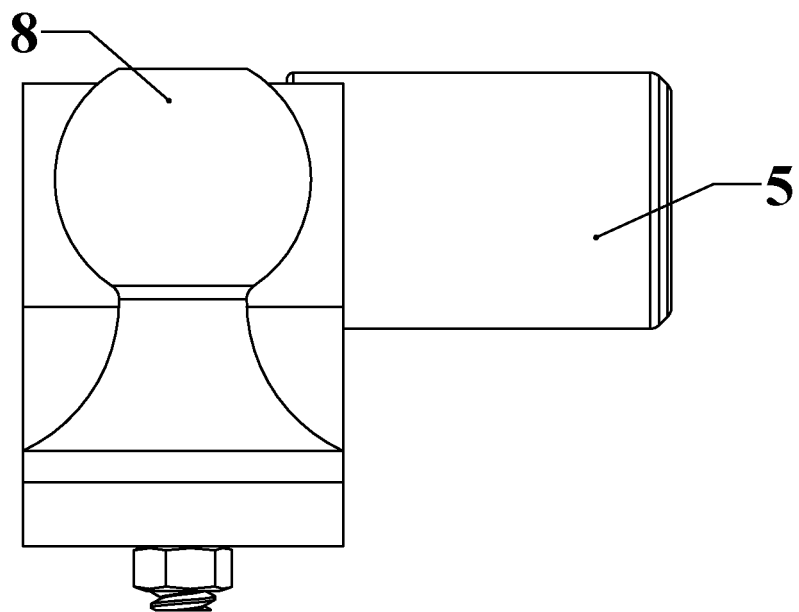
FIG. 9 is the right view of the invention illustrating relative locations of the solenoid and ball hitch.

ITEM 2 is a coupler nut between the lead screw and motor shaft (FIG. 2).

ITEM 3 is a lead screw (FIG. 2).

ITEM 4 is a square tube trailer hitch receiver (FIG. 1).

ITEM 5 is a normally extended, linear, water resistant or water proof electric solenoid(s) (FIG. 1).

ITEM 6 is a lead screw nut (FIG. 2).

ITEM 7 is a square tube ball mount hitch (FIG. 1).

ITEM 8 is a ball hitch (FIG. 1).

Figure 10:
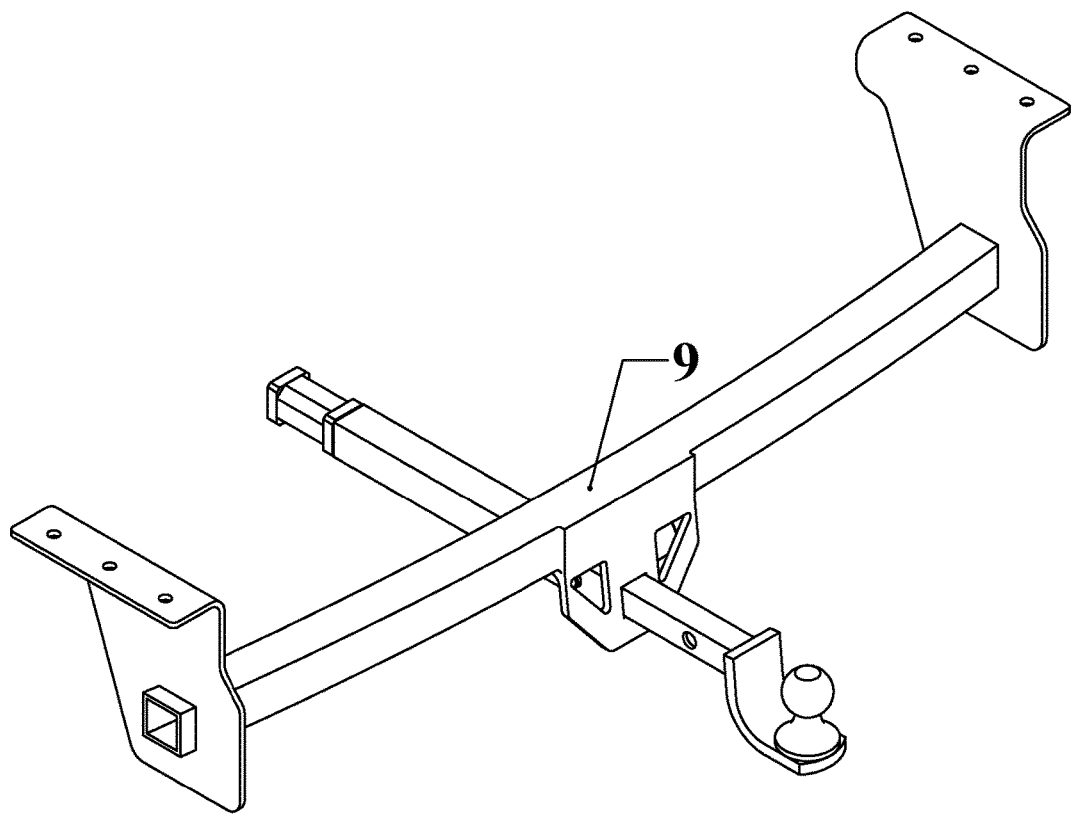
FIG. 10 illustrates the hitch frame and its location relative to the invention.

ITEM 9 is a trailer hitch frame (FIG. 10).

Figure 11:
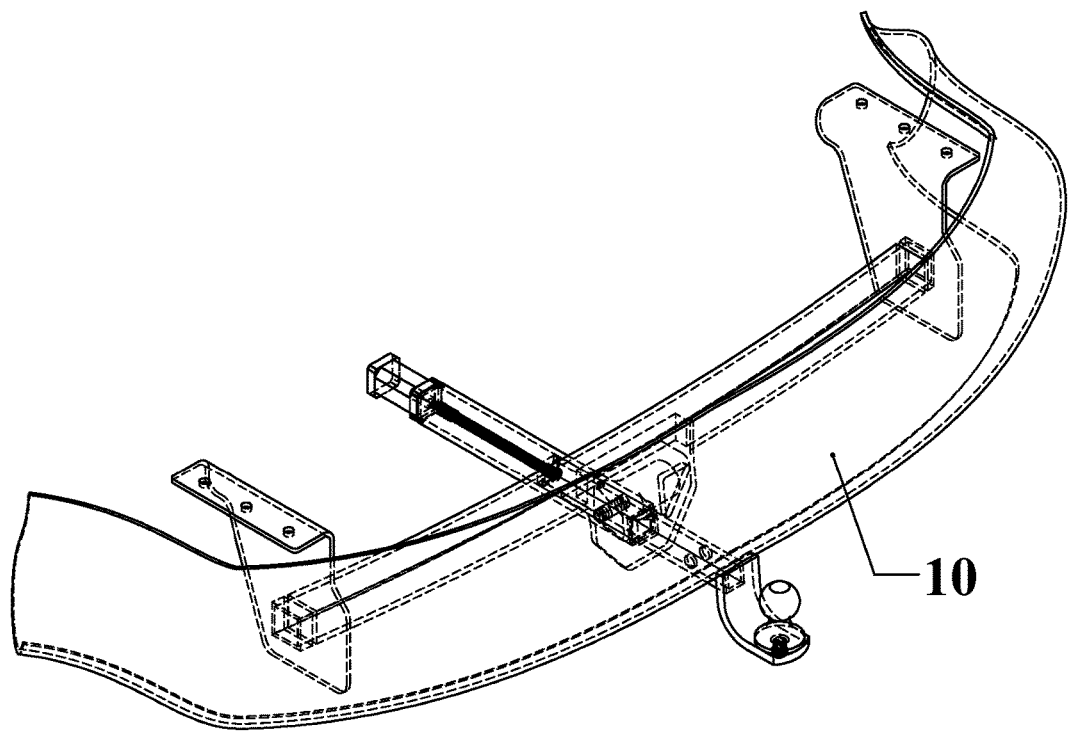
FIG. 11 is an isometric view which illustrates the extended position of the invention relative to the vehicle's bumper when mounting the invention under the bumper is applicable.

ITEM 10 is a vehicle bumper (FIG. 11).

Figure 15:
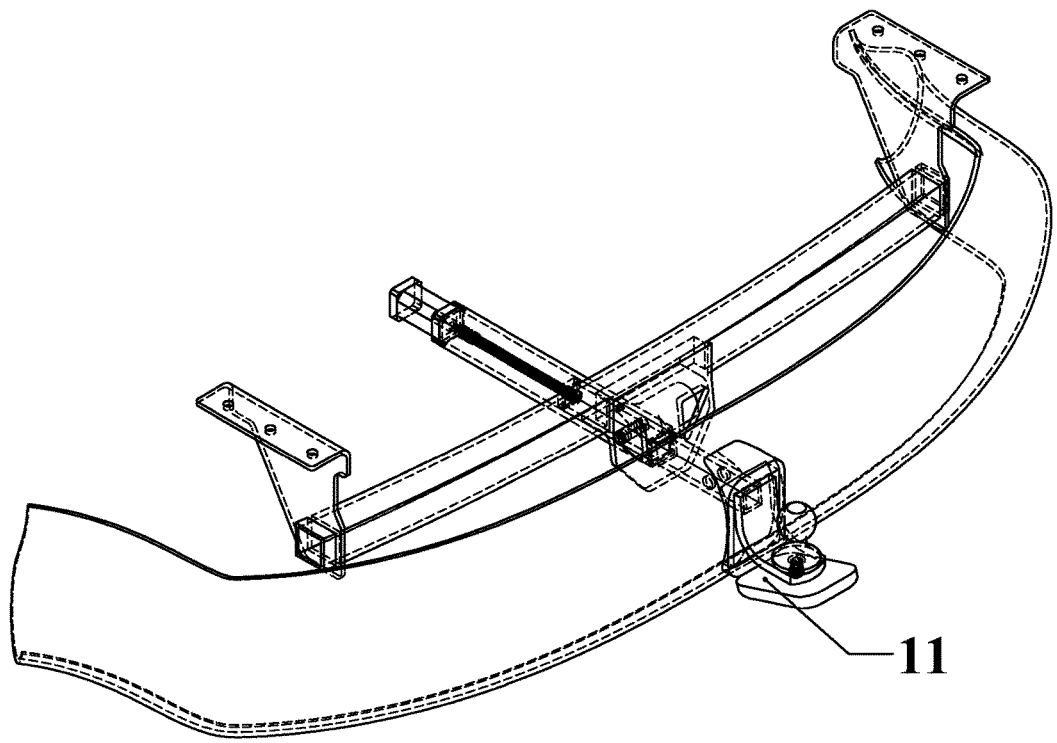
FIG. 15 is an isometric view which illustrates the extended position of the invention relative to the vehicle's bumper and bumper door when mounting the invention through the bumper is applicable.

ITEM 11 is a vehicle bumper hitch ball cover (FIG. 15).

DETAILED DESCRIPTION

Detailed reference will now be made to the preferred embodiment for the present invention by reference of the accompanied drawings. This detailed description, in combination with the accompanied drawings, is intended to represent exemplary embodiments of the present invention, rather than express the only embodiments to be implemented by this invention. Although the following embodiments of the present invention are used to express the inventive quality of the design, the following embodiments are solely for illustrative purposes. The spirit and scope of the present invention is not limited by these embodiments of the design. Specific terms are used to aid in the understanding of the preferred embodiment of the present invention. Other terms may be used to replace those terms within the spirit and scope of the present design.

FIG. 1 and FIG. 2 illustrate the preferred embodiment of the present invention, including the inventions key mechanical and electrical components. Items numbered 1 through 8 in FIG. 1 and FIG. 2 designate the components as the motor, coupler nut, lead screw, hitch receiver, linear actuator or solenoid, lead screw nut, ball hitch mount and ball hitch, respectively. In the following, any reference to these components or the present design should be cross-referenced with the accompanied drawings to aid in clarity.

Sheets 1 through 6 should accompany the following literature. Item 9 of FIG. 10 represents the frame to which the present invention would be mounted.

The present invention considers a 12 Volt Direct Current water resistant motor, leadscrew, lead screw nut, 12V water resistant solenoid and sensors to automate the concealment of the trailer hitch under or through a vehicle's bumper.

An electronic button located in the cab of the vehicle will be used to extend or retract the trailer hitch. If the trailer hitch is in its retracted position, pushing the button allows the trailer hitch to actuate to its extended position by means of the following description. The controller for the system receives the signal to actuate the normally extended solenoid to its retracted position, withdrawing the solenoid pin from at least one of one or more apertures of a plurality of apertures of the trailer hitch and one or more apertures of a plurality of apertures of the ball hitch. This releases the trailer hitch in its receiver to allow for one, linear degree of freedom of the trailer hitch.

When the solenoid retracts its pin from the locked position and the hitch is free to slide, the motor actuates transferring its motion directly to the coupler nut which in turn transfers the motion directly to the lead screw. The lead screw is then actuated in a clockwise manner creating thrust on the lead screw nut attached to the trailer hitch in the hitch receiver. This thrust pushes on the trailer hitch and actuates it outward away from the vehicle either through or under the bumper, depending on the application. At the trailer hitch's fully actuated position, the solenoid may then actuate to its normally extended position through at least one of one or more apertures of the plurality of apertures of the trailer hitch and one or more apertures of the plurality of apertures of the ball hitch to lock the trailer hitch in its extended position. The power to the motor is severed as the solenoid is in its normally extended position. This allows for the trailer load to be transferred through the trailer hitch, onto the solenoid pin and onto the vehicle's chassis through the trailer hitch frame.

With the trailer hitch in its extended position and the solenoid pin locked through the trailer hitch and frame, the trailer may now be mounted onto the ball hitch.

When the trailer is removed from the ball hitch, the process may be reversed to conceal the trailer hitch under or through the vehicle's bumper.

Sheets 7 through 10 should accompany the following literature. Item 10 of FIG. 11, FIG. 12, FIG. 13 and FIG. 14 refer to a vehicle's bumper. Item 11 of FIG. 15 and FIG. 16 refer to a vehicle's bumper door cover.

The present invention includes, but is not limited to, the automation of an extendable and retractable trailer hitch to conceal the trailer hitch and ball hitch when not in use. Possible mounting illustrations are included in FIG. 11 through FIG. 18 to represent the installation of the present invention in two applicable positions of concealment. The hitch may be concealed under the vehicle's bumper or through the vehicle's bumper. The main difference between the two concealment methods, designate a modification to the vehicle's bumper.

Figure 12:
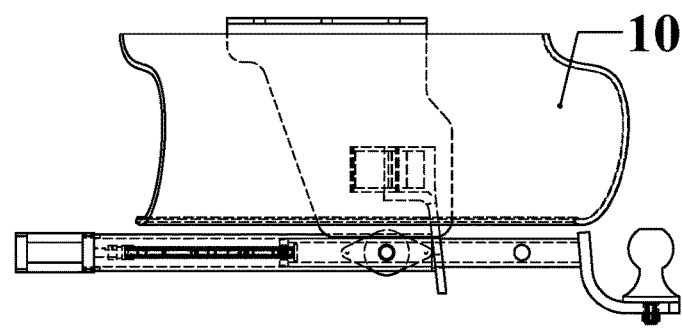
FIG. 12 is a front view which illustrates the extended position of the invention relative to the vehicle's bumper when mounting the invention under the bumper is applicable.
Figure 13:
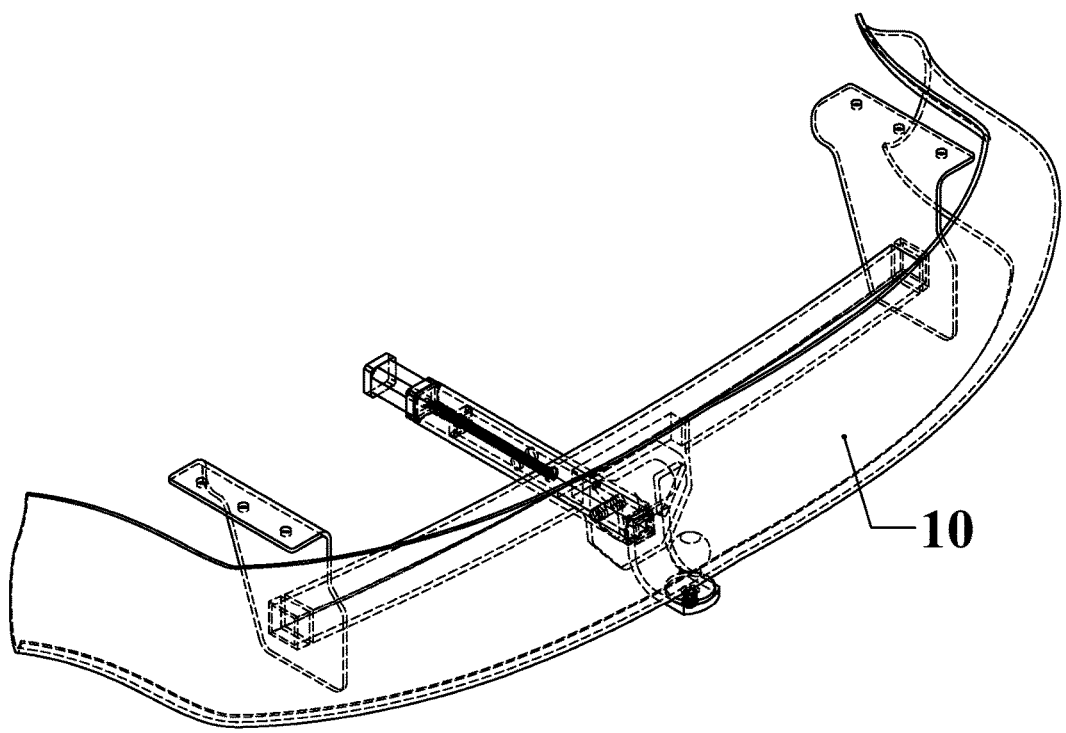
FIG. 13 is an isometric view which illustrates the retracted position of the invention relative to the vehicle's bumper when mounting the invention under the bumper is applicable.
Figure 14:
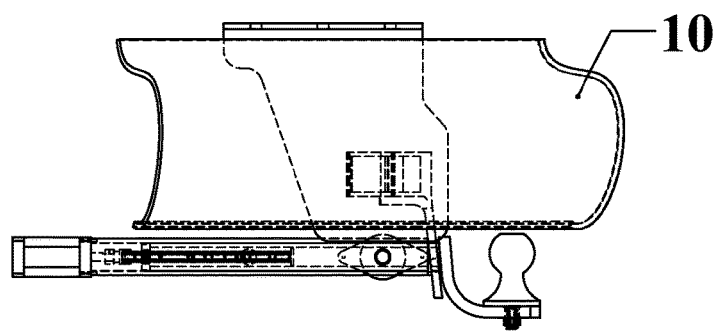
FIG. 14 is a front view which illustrates the retracted position of the invention relative to the vehicle's bumper when mounting the invention under the bumper is applicable.

FIG. 11 and FIG. 12 illustrate the conceptualized mounting location for the present invention when it is in its extended position. These figures illustrate the present invention relative to the vehicle's bumper when mounting the invention under the bumper is applicable. FIG. 13 and FIG. 14 illustrate the conceptualized mounting location for the present invention when it is in its retracted position. These figures illustrate the present invention relative to the vehicle's bumper when mounting the invention under the bumper is applicable. FIG. 14 represents how the trailer hitch may be concealed under the bumper of a vehicle.

Figure 16:
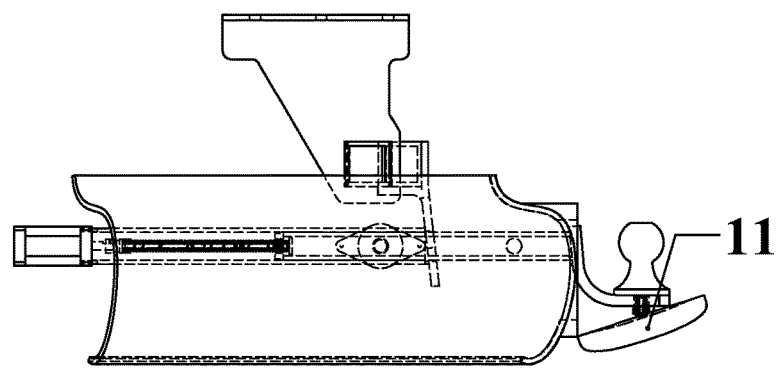
FIG. 16 is a front view which illustrates the extended position of the invention relative to the vehicle's bumper and bumper door when mounting the invention through the bumper is applicable.
Figure 17:
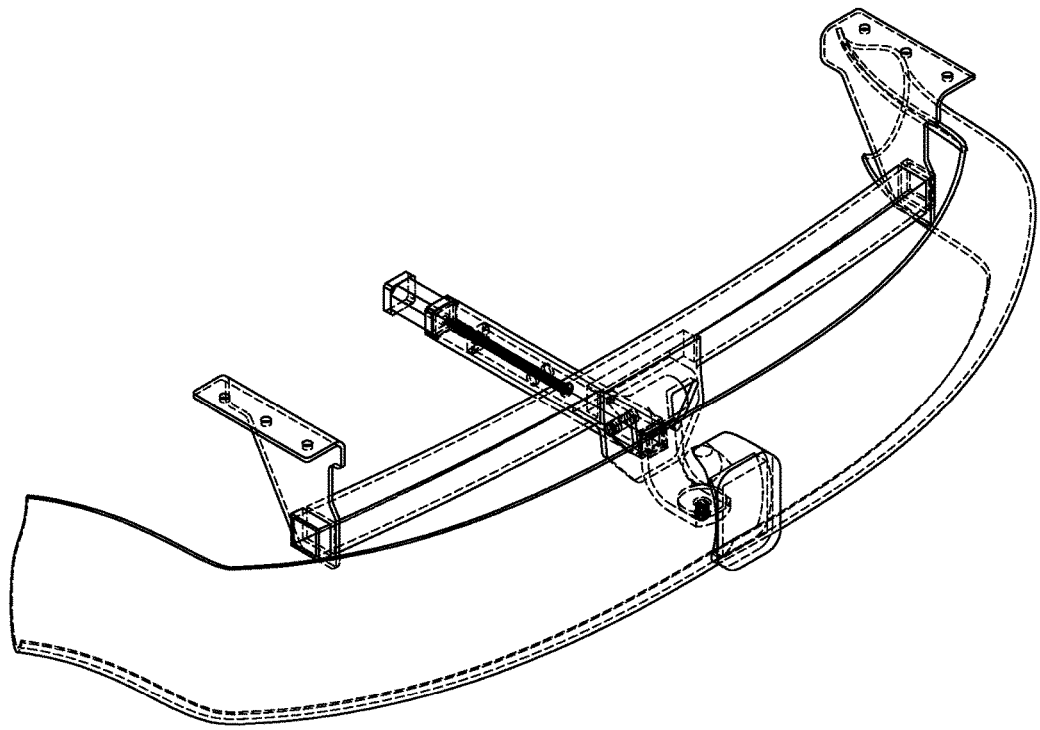
FIG. 17 is an isometric view which illustrates the retracted position of the invention relative to the vehicle's bumper and bumper door when mounting the invention through the bumper is applicable.
Figure 18:
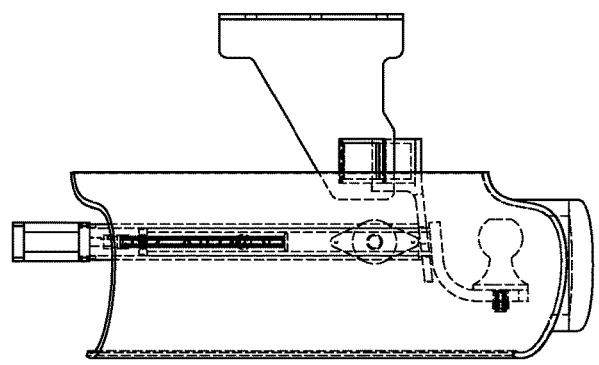
FIG. 18 is a front view which illustrates the retracted position of the invention relative to the vehicle's bumper and bumper door when mounting the invention through the bumper is applicable.

FIG. 15 and FIG. 16 illustrate the conceptualized mounting location for the present invention when it is in its extended position. These figures illustrate the present invention relative to the vehicle's bumper and bumper door cover when mounting the invention through the bumper is applicable. FIG. 17 and FIG. 18 illustrate the conceptualized mounting location for the present invention when it is in its retracted position. These figures illustrate the present invention relative to the vehicle's bumper and bumper door cover when mounting the invention through the bumper is applicable. FIG. 18 represents how the trailer hitch may be concealed through the bumper of a vehicle.

CONCLUSIONS, RAMIFICATIONS AND SCOPE

While the above description contains many specificities, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by examples given.

I claim:

1. An automatic trailer hitch comprising:
a square tube trailer hitch receiver;
an electric motor connected to a rear end of the square tube trailer hitch receiver;
a square tube ball mount hitch received within the square tube trailer hitch receiver;
a ball hitch mounted to the a square tube ball mount hitch;
a lead screw nut attached to a rear end of the a square tube ball mount hitch;
a lead screw attached to the electric motor and received within the lead screw nut;
a linear electric solenoid attached to a side of the square tube trailer hitch receiver and having a solenoid pin;
a plurality of apertures in the square tube ball mount hitch;
apertures in the square tube trailer hitch receiver;
the solenoid pin being received in one of the plurality of apertures in the square tube ball mount hitch and the apertures in the square tube trailer hitch receiver.

\* \* \* \* \*